United States Patent
Tian et al.

(10) Patent No.: US 12,405,254 B2
(45) Date of Patent: Sep. 2, 2025

(54) LOW TEMPERATURE OLIGOSACCHARIDE ANALYTICAL SYSTEM AND METHOD

(71) Applicant: DIONEX CORPORATION, Sunnyvale, CA (US)

(72) Inventors: Tian Tian, Sunnyvale, CA (US); Yan Liu, Palo Alto, CA (US)

(73) Assignee: Dionex Corporation, Sunnyvale, CA (US)

( * ) Notice: Subject to any disclaimer, the term of this patent is extended or adjusted under 35 U.S.C. 154(b) by 198 days.

(21) Appl. No.: 17/675,284

(22) Filed: Feb. 18, 2022

(65) Prior Publication Data

US 2023/0266285 A1 Aug. 24, 2023

(51) Int. Cl.
*G01N 30/72* (2006.01)
*G01N 30/16* (2006.01)
*G01N 30/30* (2006.01)
*G01N 30/32* (2006.01)
(Continued)

(52) U.S. Cl.
CPC ......... *G01N 30/7266* (2013.01); *G01N 30/16* (2013.01); *G01N 30/30* (2013.01); *G01N 30/32* (2013.01); *G01N 30/64* (2013.01); *G01N 2030/027* (2013.01); *G01N 2030/326* (2013.01)

(58) Field of Classification Search
CPC .... G01N 30/7266; G01N 30/16; G01N 30/30; G01N 30/32; G01N 30/64; G01N 2030/027; G01N 2030/326; G01N 30/54; G01N 30/88; G01N 30/96; G01N 2030/8836
See application file for complete search history.

(56) References Cited

U.S. PATENT DOCUMENTS

2008/0311672 A1* 12/2008 Dasgupta ............... G01N 30/08
  159/47.1
2013/0309655 A1* 11/2013 Kang ................... C08B 37/0078
  435/4
(Continued)

FOREIGN PATENT DOCUMENTS

PT       103757 B   *   6/2019

OTHER PUBLICATIONS

Panagiotopoulos, Christos, et al. "Sub-ambient temperature effects on the separation of monosaccharides by high-performance anion-exchange chromatography with pulse amperometric detection: Application to marine chemistry." Journal of Chromatography A 920.1-2 (2001): 13-22. (Year: 2001).*

(Continued)

Primary Examiner — Brian R Gordon
(74) Attorney, Agent, or Firm — BakerHostetler

(57) ABSTRACT

A novel analytical system and method to analyze complex carbohydrates such as human milk oligosaccharides by low-temperature High-Performance Anion Exchange Chromatography with Pulsed Amperometric Detection and High-resolution Mass Spectrometry (HPAE-PAD-MS). The analytical system controls the temperature of the column, electrochemical detector, and ion removal device at or below 15° C. The HPAE-PAD workflow with high-resolution mass spectrometry provides useful molecular structure information. It facilitates the detection of milk oligosaccharides, particularly unknown structures, without the use of analytical standards.

9 Claims, 5 Drawing Sheets

Scheme 1. System configuration of HPAE-PAD with a PdH reference electrode hyphenated to a Q Exactive HF-X Orbitrap Mass Spectrometer.

(51) Int. Cl.
    *G01N 30/64*     (2006.01)
    *G01N 30/02*     (2006.01)

(56) References Cited

U.S. PATENT DOCUMENTS

| | | | |
|---|---|---|---|
| 2016/0137530 A1* | 5/2016 | Srinivasan | B01D 61/462 210/269 |
| 2018/0125988 A1* | 5/2018 | Yang | A61K 47/6855 |
| 2018/0193767 A1* | 7/2018 | Sivavec | B01D 15/362 |
| 2022/0251137 A1* | 8/2022 | Hopp | C07K 1/36 |

OTHER PUBLICATIONS

Manisali, Irina, David DY Chen, and Bradley B. Schneider. "Electrospray ionization source geometry for mass spectrometry: past, present, and future." TrAC Trends in Analytical Chemistry 25.3 (2006): 243-256. (Year: 2006).*

Chataigné, G., F. Couderc, and Verena Poinsot. "Polysaccharides analysis of sinorhizobial capside by on-line anion exchange chromatography with pulsed amperometric detection and mass spectrometry coupling." Journal of Chromatography A 1185.2 (2008): 241-250. (Year: 2008).*

Rohrer, et al., "High-performance anion-exchange chromatography with pulsed amperometric detection for carbohydrate analysis of glycoproteins", Biochemistry (Mosc), vol. 78, No. 7, pp. 697-709, 2013.

Product Manual for CarboPac MA1, PA1, PA10, PA100, Dionex, May 2010.

Reddy, et al., "High-performance anion exchange-chromatography of neutral milk oligosaccharides and oligosaccharide alditols derived from mucin glycoproteins", Anal Biochem., vol. 198, No. 2, pp. 278-284, 1991.

Walsh, et al., "Human milk oligosaccharides: Shaping the infant gut microbiota and supporting health", Journal of Functional Foods, vol. 72, 104074, Sep. 2020.

German, et al., "Human Milk Oligosaccharides: Evolution, Structures and Bioselectivity as Substrates for Intestinal Bacteria", Nestle Nutr Workshop Ser Pediatr Program, vol. 62, pp. 205-222, 2008.

Plows, et al., "Longitudinal Changes in Human Milk Oligosaccharides (HMOs) Over the Course of 24 Months of Lactation", J Nutr., vol. 151, No. 4, pp. 876-882, 2021.

Wang, et al., "Liquid ion-exchange chromatography under pressure of milk oligosaccharides using a pulsed amperometric detector", Carbohydrate Research, vol. 189, pp. 1-11, 1989.

\* cited by examiner

Scheme 1. System configuration of HPAE-PAD with a PdH reference electrode hyphenated to a Q Exactive HF-X Orbitrap Mass Spectrometer.

LOW TEMPERATURE OLIGOSACCHARIDE ANALYTICAL SYSTEM AND METHOD

BACKGROUND

Native human milk oligosaccharides (HMOs) with a lactose core (galactose-β1-4-glucose) at the reducing end are liable to alkaline-mediated epimerization, where part of a reducing end glucose moiety epimerizes to fructose so that the lactose core turns into a lactulose core. In HPAE chromatography, a strong alkaline solution and a high system temperature, such as up to 300 mM sodium hydroxide at 30° C., are used to elute the complex carbohydrates like HMOs from the stationary phase. Under these conditions on-column epimerization of native HMOs occurs during HPAE analysis. The epimerization leads to the loss of target analytes and the formation of structures which are not present in the initial samples. Additionally, the on-column degradation can severely affect the accuracy and robustness of a quantitative method. Moreover, the commonly used HPAE-PAD method identifies oligosaccharides using analytical standards. It is challenging to identify unknown structures using PAD when analytical standards are not used.

BRIEF SUMMARY

The analytical system comprises: a) A pump configured to pump a mobile phase. b) An injection valve configured to input a sample into the mobile phase, the injection valve is fluidly coupled to an output of the pump. c) A chromatography column configured to separate a sample into one or more analytes. d) An electrochemical detector, the electrochemical detector fluidly coupled to an output of the chromatography column. e) An ion removal device configured to remove at least ions of one charge from the mobile phase, the ion removal device fluidly coupled to an output of the electrochemical detector. And f) a cooling means for keeping the chromatography column, electrochemical detector, and the ion removal device at a temperature of 15° C. or less.

A method of analyzing a sample comprises: injecting a sample into a chromatography column of the chromatography system; flowing a mobile phase into the chromatography column to separate the sample into one or more analytes that elute off the chromatography column at different times; flowing the mobile phase from the chromatography column into an electrochemical detector to detect one or more analytes; flowing the mobile phase from the electrochemical detector into an ion removal device; removing at least ions of one charge from the mobile phase in the ion removal device; and flowing the mobile phase to a mass spectrometer to detect one or more analytes;
wherein the chromatography column, electrochemical detector, and the ion removal device are at a temperature of 15° C. or less.

These and other objects and advantages shall be made apparent from the accompanying drawings and the description thereof.

BRIEF DESCRIPTION OF THE FIGURES

The accompanying drawings, which are incorporated in and constitute a part of this specification, illustrate embodiments, and together with the general description given above, and the detailed description of the embodiments given below, serve to explain the principles of the present disclosure.

DETAILED DESCRIPTION

Figure 1:
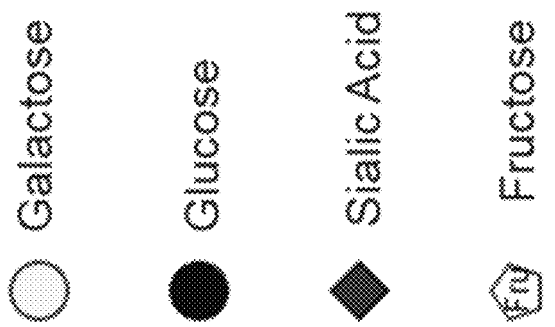
FIG. 1 shows schematics of chemical structures of example HMOs and their epimerized products: (a) 6'-sialyllactose, (b) 6'-sialyl-lactulose, (c) 3'-sialyllactose, and (d) 3'-sialyl-lactulose.
Figure 1:
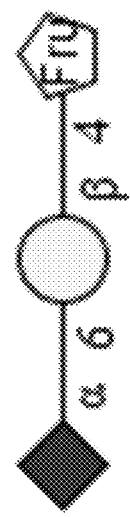
Figure 1:
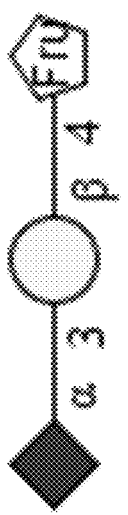
Figure 1:
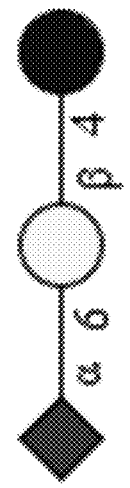
Figure 1:
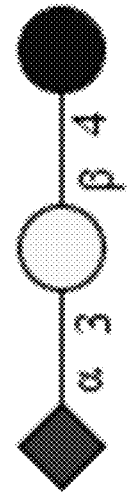

A novel analytical system and method to analyze complex carbohydrates such as human milk oligosaccharides by low-temperature High-Performance Anion Exchange Chromatography with Pulsed Amperometric Detection and High-resolution Mass Spectrometry (HPAE-PAD-MS). The analytical system controls the temperature of the column, electrochemical detector, and ion removal device at or below 15° C. The HPAE-PAD workflow with high-resolution mass spectrometry provides useful molecular structure information. It facilitates the detection of milk oligosaccharides, particularly unknown structures, without the use of analytical standards.

Human milk oligosaccharides (HMOs) are a family of free oligosaccharides found in human milk. HMOs compose of diverse structures, and more than 200 different HMO structures have been identified and reported. Structurally, all HMOs contain a lactose core (galactose-β1-4-glucose) at the reducing end, elongated via the addition of N-acetylglucosamine units. Further structural diversity includes adding fucose and sialic acid residues at the terminal positions [J. German, S. Freeman, C. Lebrilla, D. Mills, Human milk oligosaccharides: Evolution, structures and bioselectivity as substrates for intestinal bacteria, in: Nestle Nutr. Work. Ser. Pediatr. Progr., Nestle Nutr Workshop Ser Pediatr Program, 2008: pp. 205-218. C. Walsh, J. A. Lane, D. van Sinderen, R. M. Hickey, Human milk oligosaccharides: Shaping the infant gut microbiota and supporting health, J. Funct. Foods. 72 (2020) 104074].

HMOs are a vital component of infant nutrition. Numerous publications have demonstrated the importance of HMOs in enhancing the development of intestinal microbiota and bolstering the immune system in breastfed infants [J. German, S. Freeman, C. Lebrilla, D. Mills, Human milk oligosaccharides: Evolution, structures and bioselectivity as substrates for intestinal bacteria, in: Nestle Nutr. Work. Ser. Pediatr. Progr., Nestle Nutr Workshop Ser Pediatr Program, 2008: pp. 205-218. C. Walsh, J. A. Lane, D. van Sinderen, R. M. Hickey, Human milk oligosaccharides: Shaping the infant gut microbiota and supporting health, J. Funct. Foods. 72 (2020) 104074]. The presence and abundance of individual oligosaccharides in human milk vary significantly among individuals, differing in genotype, ethnicity of the mothers, and the course of lactation [J. F. Plows, P. K.

Berger, R. B. Jones, T. L. Alderete, C. Yonemitsu, J. A. Najera, S. Khwajazada, L. Bode, M. I. Goran, Longitudinal Changes in Human Milk Oligosaccharides (HMOs) Over the Course of 24 Months of Lactation, J. Nutr. 151 (2021) 876-882].

High-performance anion-exchange (HPAE) chromatography is a widely used analytical technique for the separation of oligosaccharides. The HPAE technology takes advantage of the weakly acidic nature of oligosaccharides to give highly selective separations at high pH using a strong anion-exchange stationary phase. Oligosaccharides lack a chromatophore or fluorophore and cannot be easily detected with a UV-Vis or a fluorescence detector. The advent of pulsed amperometric detection (PAD) significantly improved the detection sensitivity limit of oligosaccharides in their native form, without the need for chemical derivatization. With PAD, oligosaccharides are detected by measuring the electrical current generated by their oxidation at the surface of a gold electrode. HPAE-PAD is a powerful analytical tool that permits direct quantification of non-derivatized oligosaccharides at low-picomole levels with minimal sample preparation and cleanup.

In HPAE chromatography, strong alkaline solutions such as up to 300 mM sodium hydroxide are commonly used to elute oligosaccharides like HMOs from the stationary phase. While the high alkaline concentration facilitates the resolution of a mixture of oligosaccharides, high alkaline conditions cause epimerization and degradation of reducing oligosaccharides. Human milk oligosaccharides contain a lactose core (galactose-β1-4-glucose) at the reducing end. Therefore, they are liable to the risk of alkaline epimerization inside the HPAEC column. The reducing end glucose moiety could be epimerized to a fructose unit, converting a lactose core to a lactulose core (galactose-β1-4-fructose). Two milk oligosaccharides, lacto-N-tetraose and lacto-N-fucopentaose II, were reported to be degraded at least 50% in several hours in 0.15 M sodium hydroxide (W. Tong Wang, D. Zopf, Liquid ion-exchange chromatography under pressure of milk oligosaccharides using a pulsed amperometric detector, Carbohydr. Res. 189 (1989) 1-11.). In addition, under alkaline conditions (at 0.01 N NaOH 35° C. for 24 hours), significant (15 to 50%) epimerization of 3'-sialyllactose to 3'-sialyl-lactulose was observed. The common HPAE column and electrochemical detection cell operate at temperatures between 20° C. and 45° C. FIG. 1 shows some examples of HMOs and their epimerized products: (a) 6'-sialyllactose, (b) 6'-sialyl-lactulose, (c) 3'-sialyllactose, and (d) 3'-sialyl-lactulose.

Figure 2:
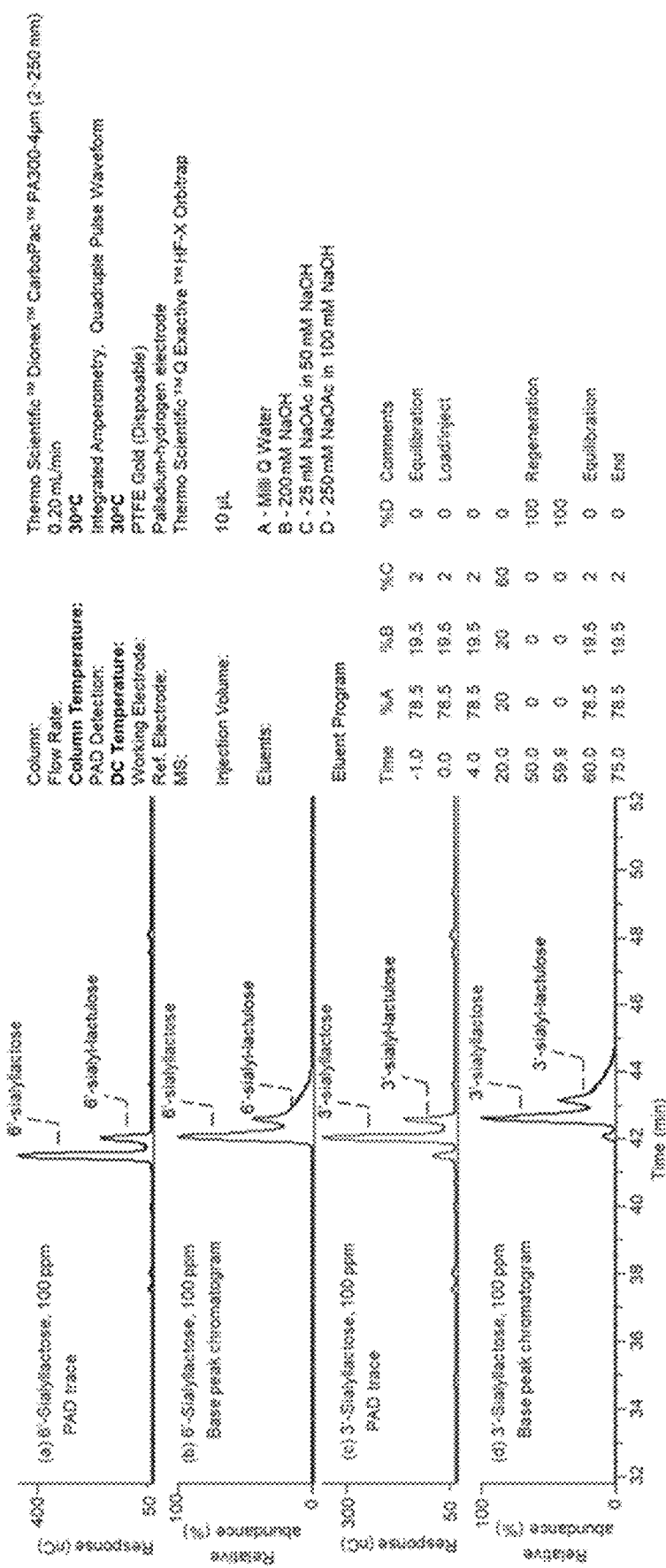
FIG. 2 shows chromatograms of 6'-sialyllactose (6'-SL) (a &b) and 3'-sialyllactose (3'-SL) (c &d) analytical standards at 100 ppm at an HPAE system temperature of 30° C. PAD traces in (a) and (c) were obtained by pulsed amperometric detector, and BPC in (b) and (d) were obtained by MS.

FIG. 2 shows the chromatograms of injecting 6'-sialyllactose (a&b) and 3'-sialyllactose (c&d) standard solutions into an HPAE-PAD-MS system at a system temperature of 30° C. The pure analytical standard solutions were prepared individually by dissolving the neat standard materials (>99% purity) in water at 100 ppm. Then, ten microliters of those standards were injected into the HPAE-PAD-MS system. Each injection resulted in two chromatograms simultaneously, i.e., PAD traces (FIGS. 2(a) and 2(c)) obtained by the electrochemical detection and Base Peak Chromatograms (FIGS. 2(b) and 2(d)) obtained by the MS. In each chromatogram, a small peak was observed next to the target analyte peak. The unknown peaks were identified as sialyl-lactulose isomers produced by on-column epimerization. The presence of 6'-sialyl-lactulose and 3'-sialyl-lactulose are believed to be due to on-column epimerization mediated by high sodium hydroxide eluent concentration, long retention time, and a relatively high HPAEC system temperature (30° C.).

The on-column oligosaccharide epimerization and degradation during HPAE analysis can cause several issues. First, the appearance of extra peaks can bring about bias to the data and possibly misidentified structural isomers which are not initially present in the samples. Additionally, the on-column degradation could severely affect the accuracy and robustness of a quantitative method. The alkaline mediated on-column epimerization of milk oligosaccharides can be alleviated by reducing the elution time, using a lower hydroxide concentration with compensation of higher acetate, or if the oligosaccharides are reduced before HPAE chromatography. However, diluted hydroxide eluent may fail to achieve the designed resolution for a complex mixture of oligosaccharides like HMOs. In addition, the reduction reaction represents additional sample preparation and cleanup steps and could yield to the loss of low abundant oligosaccharides. Moreover, it is challenging to identify the unknown structures using PAD only, particularly when no such analytical standards are available. There is a need for improved anion exchange chromatographic conditions to protect the native milk oligosaccharides from alkaline and temperature-mediated epimerization.

The analytical system comprises: a) A pump configured to pump a mobile phase. b) An injection valve configured to input a sample into the mobile phase, the injection valve is fluidly coupled to an output of the pump. c) A chromatography column configured to separate a sample into one or more analytes. d) An electrochemical detector, the electrochemical detector fluidly coupled to an output of the chromatography column. e) An ion removal device configured to remove at least ions of one charge from the mobile phase, the ion removal device fluidly coupled to an output of the electrochemical detector. And f) a cooling means for keeping the chromatography column, electrochemical detector, and the ion removal device at a temperature of 15° C. or less.

Figure 5:
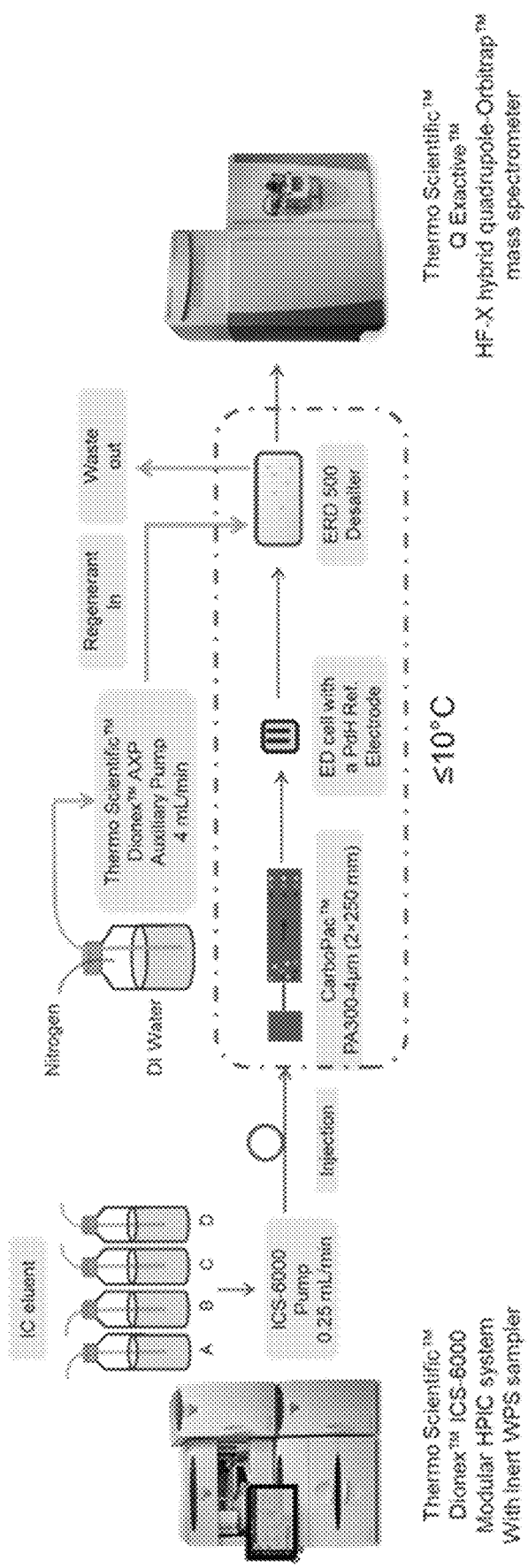
FIG. 5 shows a schematic of an embodiment of a HPAE-PAD-MS system configuration used to characterize milk oligosaccharides.

FIG. 5 shows a schematic of an embodiment of a HPAE-PAD-MS system configuration used to characterize milk oligosaccharides. Two pumps were used-one for the IC eluent system, and another for water regeneration of the downstream desalter. Column effluent was first passed through the PAD detector with a PdH reference electrode. The oxyanions of carbohydrates were detected by measuring the electrical current generated by their oxidation at the surface of a gold working electrode. The cell effluent was then passed through the Dionex™ ERD 500 electrolytically regenerated desalter, where sodium ions were exchanged for hydronium and eluting oligosaccharides were in water (hydroxide-only eluent) or weak acetic acid. This effluent, containing oligosaccharides, was injected into the MS with a HESI-II probe. In some embodiments, the column, electrochemical detection cell, and the desalter were kept at or below 10° C.

A method of analyzing a sample comprises: injecting a sample into a chromatography column of the chromatography system; flowing a mobile phase into the chromatography column to separate the sample into one or more analytes that elute off the chromatography column at different times; flowing the mobile phase from the chromatography column into an electrochemical detector to detect one or more analytes; flowing the mobile phase from the electrochemical detector into an ion removal device; removing at least ions of one charge from the mobile phase in the ion removal device; and flowing the mobile phase to a mass spectrometer to detect one or more analytes;

wherein the chromatography column, electrochemical detector, and the ion removal device are at a temperature of 15° C. or less.

In some embodiments, the mobile phase comprises an alkali salt and a low molecular weight acid which are compatible with the operation of HPAE and MS systems, such as alkali metal ions and low molecular weight acid or alkali hydroxide or an alkali acetate. Examples of alkali hydroxide include, but are not limited to LiOH, NaOH, and KOH. Examples of alkali acetate include, but are not limited to LiOAc, NaOAc, and KOAc. In some embodiments, the mobile phase comprises both alkali hydroxide and alkali acetate, such as NaOH and NaOAc. In some embodiments, mobile phases used for separating oligosaccharides comprises an alkali acetate (e.g. up to 200-400 mM NaOAc) gradient in constant alkali hydroxide (typically 100 mM NaOH).

Analytical systems often use an analytical standard to help identify the species to be detected. However, they can also interfere or hide compounds in the chromatogram. In some embodiments, the analytical system or method does not comprise the use of an analytical standard.

In some embodiments, the analytical system comprises a mass spectrometer (MS). The addition of a MS provides faster and more reliable identification and peak confirmation. In some embodiments, the MS comprises an electrospray ionization source which is configured to vaporize the analytes into ions in the gas phase. In addition, it can be used to elucidate complex oligosaccharide structures. One area of particular interest is oligosaccharide analysis, which has grown rapidly as a result of increasing use of biopharmaceutical products. Another area of importance is characterization of prebiotics and other oligosaccharides and polysaccharides in food and nutrition research, where HPAE-PAD has already been an established technique in profiling the oligosaccharides and polysaccharides, and HPAE-MS can offer a more in-depth characterization.

Interfacing HPAE and MS is a technological challenge. Typical alkali acetate and hydroxide eluents used in separation of oligosaccharides are not compatible with electrospray ionization (ESI) and mass spectrometer, due to their non-volatility and high conductance.

Examples of ion removal devices (desalter) include suppressors. For self-regenerated suppressors, constant current is applied to the electrodes to cause the water electrolysis for continuous supply of hydronium or hydroxide ions for the eluent suppression. A suppressor can be designed to remove ions of a single charge or ions of both positive and negative charges. In some embodiments, the ion removal device is configured to remove only ions of a single charge. Ions to be removed are typically eluent counterions. In some embodiments, the ions of one charge are selected from the group consisting of lithium, sodium, potassium, cesium, and rubidium. The suppressor converts the non-volatile salt into water or the volatile acid form (e.g., acetic acid). In some embodiments, a device supplies a regenerant solution to the ion removal device, such as a pressurized reservoir or a pump. In some embodiments, the ion removal device is a chemically-regenerated packed bed suppressor.

In some embodiments, the function of the suppressor is to remove non-volatile salts or converts them to a volatile form to allow compatibility with a MS. The most popular commercial suppressors are in the form of a three-channel sandwich-type design, in which the eluent channel carrying the sample is separated by two ion exchange membranes from the flanking regenerant channels carrying water stream. A flat plate electrode is placed in each of the regenerant channels. A constant current is passed between the two electrodes. The electrolysis of water in the regenerant channels produces hydronium ions and hydroxide ions, used for the suppression of the eluent. The continuous supply of water in the regenerant channel is critical to the stability of the suppressor performance.

The use of an electrochemical detector is a well-known technique. A voltage appropriate for the species to be detected is applied between two electrodes in communication with a fluid possibly containing that species. The voltage is selected which is sufficient to cause oxidation or reduction of the species to be detected but ideally not any other species in the fluid. The resulting current between the electrodes in response to the applied voltage can then provide an indication of the presence or concentration of the species to be detected. In some embodiments, the electrochemical detector is a pulsed amperometric detector. When detecting aliphatic organic compounds at an anode, where the electrolyte is in direct contact with the anode and cathode, it has been recognized that the anode can become fouled. A technique known as pulsed amperometric detection has been used in which a reading potential is applied, followed by a large positive potential to oxidatively desorb adsorbed hydrocarbons, then followed by a large negative potential to cathodically dissolve the oxides. In some embodiments, the pulsed amperometric detector comprises gold, platinum, or another noble metal electrode. In some embodiments, the pulsed amperometric detector comprises a gold electrode.

The analytical system comprises a cooling means for keeping the chromatography column, electrochemical detector, and the ion removal device at a temperature of 15° C. or less. The cooling means may be a refrigerator system or a thermoelectric cooling device. In some embodiments there are independent cooling devices for one or more of the column, ED detector, and suppressor. In some embodiments, the temperature of the chromatography column, electrochemical detector, and the ion removal device are at a temperature of 10° C. or less.

In the present disclosure the singular forms "a", "an" and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

The modifier "about" should be considered as disclosing the range defined by the absolute values of the two endpoints. For example, the expression "from about 2 to about 4" also discloses the range "from 2 to 4." When used to modify a single number, the term "about" may refer to plus or minus 10% of the indicated number and includes the indicated number. For example, "about 10%" may indicate a range of 9% to 11%, and "about 1" means from 0.9 to 1.1.

When a list is presented, unless stated otherwise, it is to be understood that each individual element of that list and every combination of that list is to be interpreted as a separate embodiment. For example, a list of embodiments presented as "A, B, or C" is to be interpreted as including the embodiments, "A," "B," "C," "A or B," "A or C," "B or C," or "A, B, or C."

Where present, all ranges are inclusive and combinable. That is, references to values stated in ranges include every value within that range. For example, a range defined as from 400 to 450 ppm includes 400 ppm and 450 ppm as independent embodiments. Ranges of 400 to 450 ppm and 450 to 500 ppm may be combined to be a range of 400 to 500 ppm.

It is to be appreciated that certain features of the invention which are, for clarity, described herein in the context of separate embodiments, may also be provided in combination in a single embodiment. That is, unless obviously incompatible or excluded, each individual embodiment is deemed to be combinable with any other embodiment s) and such a combination is considered to be another embodiment. Conversely, various features of the invention that are, for brevity, described in the context of a single embodiment, may also be provided separately or in any sub-combination. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Finally, while an embodiment may be described as part of a series of steps or part of a more general structure, each said step may also be considered an independent embodiment in itself.

While the present disclosure has illustrated by description several embodiments and while the illustrative embodiments have been described in considerable detail, it is not the intention of the applicant to restrict or in any way limit the scope of the appended claims to such detail. Additional advantages and modifications may readily appear to those skilled in the art. Furthermore, features from separate lists can be combined; and features from the examples can be generalized to the whole disclosure.

EXAMPLES

Example 1: Sample Preparation

Human milk oligosaccharides were purified prior to analysis. Milk (500 µL) was mixed with an equal volume of Milli-Q water and centrifuged at 4,000×g for 30 min at 4° C. The top lipid and bottom casein layers were discarded while the skim milk's middle layer was transferred to a new tube and mixed with two-volume equivalents of ethanol. The mixture was stored at −80° C. for an hour to precipitate proteins. The precipitated protein was discarded after centrifugation at 4,000×g for 30 min at 4° C. The supernatant was dried in a SAVANT SC210A SpeedVac Concentrator (Thermo Scientific, Waltham, MA) and resuspended in 500 µL Milli-Q water for further purification with porous graphitized carbon SPE microplate, HYPERSEP™ HYPERCARB™ filter plates. The microplates were conditioned with 80% acetonitrile (ACN)/0.1% trifluoroacetic acid (TFA) and equilibrated with 2% ACN/0.1% TFA. Samples were loaded, and the microplate wells were each washed with 600 µL of 2% ACN/0.1% TFA to remove monosaccharides and lactose. Oligosaccharides were eluted in 600 µL 40% ACN containing 0.1% TFA and evaporated to dryness in a SpeedVac. Oligosaccharides were reconstituted in Milli-Q water before injection.

Example 2: Instrument Configuration

The Dionex ICS-6000 HPIC system was configured for the hyphenation of electrochemical and MS detections. The equipment component is listed in table 1.

TABLE 1

| IC-MS system component |
| --- |
| Equipment<br>Thermo Scientific ™ Dionex ™ ICS-6000 HPIC system with: |
| Dual pump<br>Detector/Chromatography Module<br>Thermo Scientific ™ UltiMate ™ WPS TBPL Thermostatted<br>Biocompatible Standard Well Plate Autosampler<br>Thermo Scientific ™ Dionex ™ CarboPac ™ PA300-4 µm Columns: |
| Dionex ™ CarboPac ™ PA300-4 µm Guard Column (2 × 50 mm)<br>Dionex ™ CarboPac ™ PA300-4 µm Analytical Column (2 × 250 mm)<br>Electrochemical Cells: |
| Thermo Scientific ™ Dionex ™ ICS-6000 ED Electrochemical<br>Detector (without cell)<br>Thermo Scientific ™ Dionex ™ ICS-6000 ED<br>Electrochemical Detector Cell with<br>Reference Electrode and Spacer Block (no working electrode)<br>Gold on PTFE Disposable Electrode, 6 gaskets (0.002 in.)<br>Palladium Hydrogen Reference Electrode (PdH)<br>Mass Spectrometer Components: |
| Thermo Scientific ™ Heated Electrospray Ionization (HESI-II) Probe<br>Thermo Scientific ™ Q Exactive ™ Hybrid Quadrupole<br>Orbitrap ™ Mass Spectrometer<br>IC-MS interface: |
| Dionex ™ AXP Auxiliary Pump<br>Thermo Scientific ™ Dionex ™ ERD ™ 500 Electrolytically<br>Regenerated Desalter, 2 mm |

Example 3: HPAE Separation of HMOs

HMOs separation was performed with a Dionex™ ICS-6000 HPIC system equipped with an ULTIMATE™ WPS autosampler and an electrochemical detector with a palladium hydrogen (PdH) reference electrode. The parameters of the WPS autoampler is shown in table 2. The IC system was equipped with a CARBOPAC™ PA300-4 µm analytical column (2×250 mm) and a CARBOPAC™ PA300-4 µm guard column (2×50 mm). The column flow was at 0.2 ml/min. The eluent program used to elute oligosaccharides from the column is outlined in Table 2. Pulsed amperometric detection was applied to obtain ED chromatograms of the oligosaccharides. A disposable gold electrode on PTFE and a PdH reference electrode were used for PAD detection. The data acquisition frequency was set to 2 Hz using the standard four-potential waveform designed for carbohydrate analysis with the PdH reference electrode.

An electrolytically regenerated desalter, ERD 500 in 2 mm format, was applied to remove sodium and hydroxide ions prior to ionization into the mass spectrometer. The desalter was operated constant at 320 mA and regenerated externally with deionized water at 4 mL/min by Dionex AXP Auxiliary pump.

The guard and analytical columns, electrochemical detection cell, and the ERD500 desalter, were all kept and operated at 10° C.

TABLE 2

| HPAE conditions for oligosaccharides separation | |
| --- | --- |
| Autosampler: | Parameters |
| Injection Volume: | 10 µL |
| Injection mode: | Partial loop |
| Flush volume: | 15 µL |
| Temperature: | 4 ° C. |

TABLE 2-continued

| Pump: | | | | | |
|---|---|---|---|---|---|
| Eluent A: | Milli-Q Water | | | | |
| Eluent B: | 200 mM NaOH | | | | |
| Eluent C: | 25 mM Sodium Acetate in 50 mM NaOH | | | | |
| Eluent D: | 250 mM Sodium Acetate in 100 mM NaOH | | | | |
| Flow Rate: | 0.2 mL/min | | | | |
| Column Temperature: | 10° C. | | | | |

| Eluent Program: | Time | % A | % B | % C | % D | Comments |
|---|---|---|---|---|---|---|
| | −1.0 | 68.5 | 29.5 | 2 | 0 | Equilibration |
| | 0.0 | 68.5 | 29.5 | 2 | 0 | Load/inject |
| | 15.0 | 5 | 35 | 60 | 0 | |
| | 45.0 | 25 | 25 | 0 | 50 | |
| | 55.0 | 0 | 0 | 0 | 100 | Regeneration |
| | 59.9 | 0 | 0 | 0 | 100 | |
| | 60.0 | 68.5 | 29.5 | 2 | 0 | Equilibration |
| | 75.0 | 68.5 | 29.5 | 2 | 0 | End |

Example 4: Mass Spectrometry Analysis

Mass spectrometric analyses were performed using a Q EXACTIVE™ Hybrid QUADRUPOLE-ORBITRAP™ mass spectrometer. Sample was introduced by a heated electrospray ionization (HESI-II) probe operating in negative ionization mode. The spray voltage was at 3.2 kV, and the capillary temperature was 320° C. The sheath and auxiliary gas flow rate were set to 40 and 20 arbitrary units, respectively. For full scans, the data was acquired across the scan range of 400-2000 m/z. The AGC target was set to $1 \times 10^6$ with a maximum injection time of 60 ms and a resolution of 60,000. For $MS^2$, the AGC target was set to $1 \times 10^5$ with a maximum injection time of 300 ms and a resolution of 15,000. Five scans were performed at a normalized collisional energy of 28.

Example 5: Data Analysis and HMO Structural Identification

The MS data were processed with THERMO SCIENTIFIC™ XCALIBUR™. All proposed oligosaccharide structures were identified using their monoisotopic m/z of the precursor mass and HCD-based MS/MS fragmentation. The proposed HMO structures were confirmed with a previous published HMO structural library.

Example 6: System Temperature

Figure 3:
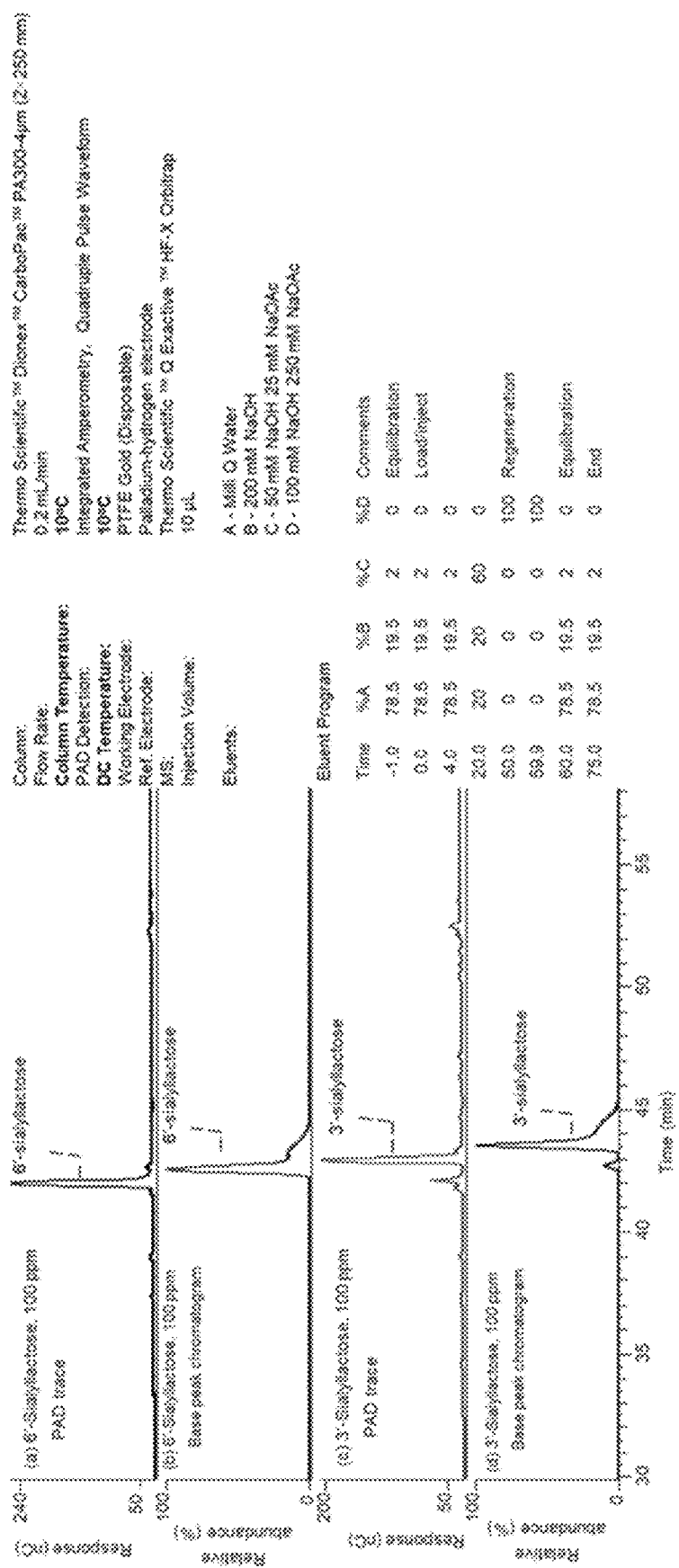
FIG. 3 shows chromatograms of 6'-sialyllactose (6'-SL) (a &b) and 3'-sialyllactose (3'-SL) (c &d) analytical standards at 100 ppm at 10° C. of HPAE system temperature. PAD traces in (a) and (c) were obtained by pulsed amperometric detector, and BPC in (b) and (d) were obtained by MS.

FIG. 3 demonstrates the effect of system temperatures on the on-column epimerization rate. Two analytical standards, 6'-sialyllactose and 3'-sialyllactose, were analyzed using the same analytical conditions as shown in FIG. 2, except that the HPAE system (column, electrochemical detection cell, and desalter) was maintained at 10° C. Both sialyl-lactulose peaks were almost eliminated at 10° C. system operating temperature, demonstrating the effectiveness of low system temperature in controlling the HMO epimerization.

Figure 4:
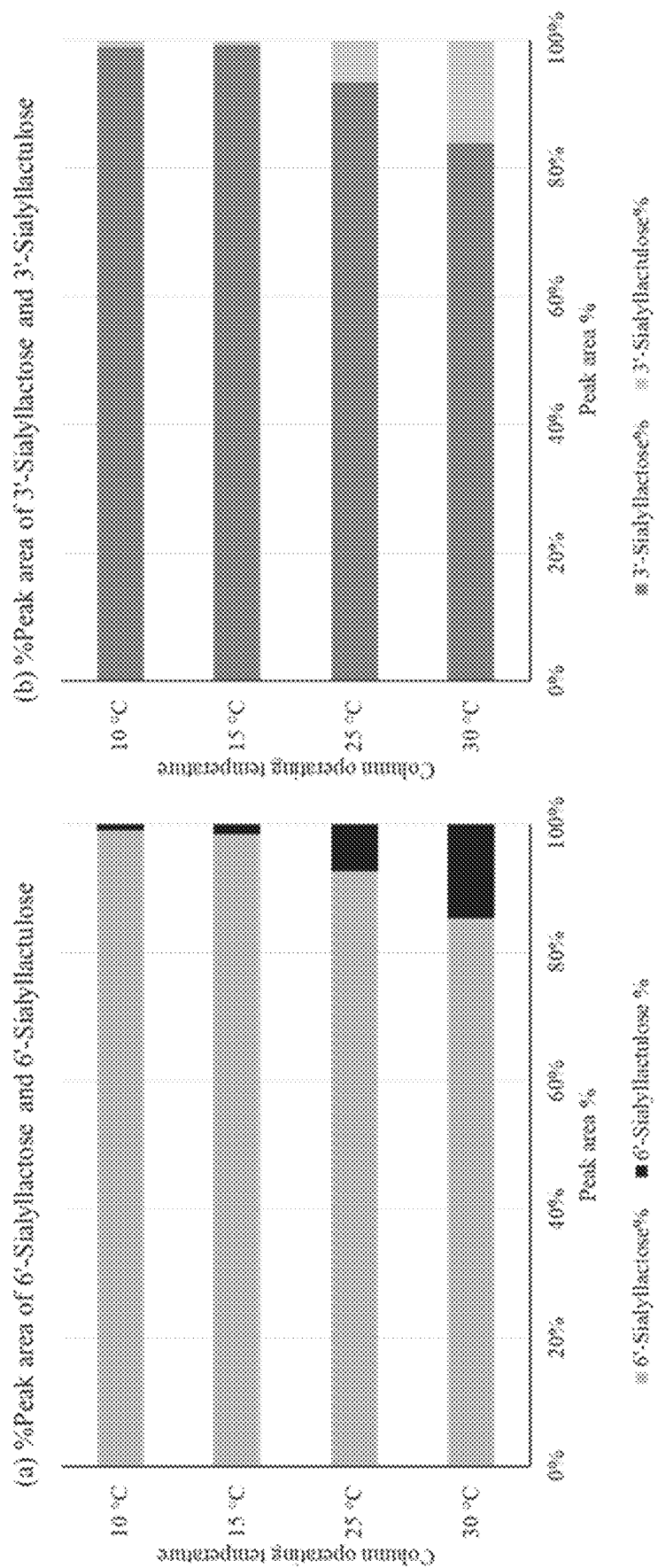
FIG. 4 shows the percentage of peak area of 6'-sialyllactose and 3'-siallyllactose and their on-column epimerization products, 6'-sialyl-lactulose and 3'-sialyl-lactulose, under different HPAE system temperature.

FIG. 4 shows the change of peak area percentages for these two sialyllactose molecules and their on-column epimerization products. The peak area percentage of 6'-sialyl-lactulose and 3'-sialyl-lactulose were below 2% when the HPAE system was operating at 10° C.

What is claimed is:

1. A method of analyzing an oligosaccharide sample, the method comprising:
   injecting the oligosaccharide sample into a chromatography column of the chromatography system;
   flowing a mobile phase into the chromatography column to separate the oligosaccharide sample into one or more analytes that elute off the chromatography column at different times;
   flowing the mobile phase from the chromatography column into an electrochemical detector to detect one or more analytes;
   flowing the mobile phase from the electrochemical detector into an ion removal device;
   removing at least ions of one charge from the mobile phase in the ion removal device; and
   flowing the mobile phase to a mass spectrometer;
   wherein the chromatography column, electrochemical detector, and the ion removal device are all at a temperature of 15° C. or less;
   wherein less than 5% of the oligosaccharide sample is epimerized.

2. The method of claim 1, wherein the electrochemical detector is a pulsed amperometric detector.

3. The method of claim 2, wherein the pulsed amperometric detector comprises a gold electrode.

4. The method of claim 1, wherein the chromatography column, electrochemical detector, and the ion removal device are all at a temperature of 10° C. or less.

5. The method of claim 1, wherein the mobile phase comprises NaOH and NaOAc.

6. The method of claim 1, wherein the sample comprises oligosaccharides.

7. The method of claim 1, wherein the ion removal device is a suppressor.

8. The method of claim 1, wherein the mass spectrometer comprises an electrospray ionization source to vaporize the analytes into ions in a gas phase.

9. The method of claim 1, wherein the one or more analytes are detected by the mass spectrometer.

* * * * *